(12) United States Patent
Schlosser

(10) Patent No.: US 9,119,378 B2
(45) Date of Patent: Sep. 1, 2015

(54) PET LEASH WITH ADJUSTABLE SECURITY EXTENSION

(71) Applicant: Joanna Frances Schlosser, Marietta, GA (US)

(72) Inventor: Joanna Frances Schlosser, Marietta, GA (US)

(*) Notice: Subject to any disclaimer, the term of this patent is extended or adjusted under 35 U.S.C. 154(b) by 0 days.

(21) Appl. No.: 14/093,071

(22) Filed: Nov. 29, 2013

(65) Prior Publication Data

US 2015/0150221 A1      Jun. 4, 2015

(51) Int. Cl.
*A01K 27/00*      (2006.01)

(52) U.S. Cl.
CPC ............. *A01K 27/003* (2013.01); *A01K 27/005* (2013.01)

(58) Field of Classification Search
CPC . A01K 27/003; A01K 27/002; A01K 27/005; A01K 27/001; A01K 27/00
USPC ........... 119/795, 792, 793, 797.798; D30/153
See application file for complete search history.

(56) References Cited

U.S. PATENT DOCUMENTS

| | | | |
|---|---|---|---|
| 6,237,539 B1 * | 5/2001 | Sporn | 119/795 |
| 6,626,132 B1 * | 9/2003 | Mann | 119/795 |
| 6,851,393 B2 * | 2/2005 | Bremm | 119/770 |
| 6,990,929 B2 * | 1/2006 | Young, III | 119/798 |
| 7,757,639 B1 * | 7/2010 | Prendes | 119/772 |
| D652,584 S * | 1/2012 | Lawley | D30/153 |
| D652,585 S * | 1/2012 | Lawley | D30/153 |
| D669,233 S * | 10/2012 | Ranstead | D30/153 |
| 8,327,808 B2 * | 12/2012 | Chirico | 119/792 |
| D685,143 S * | 6/2013 | Hess | D30/153 |
| 2006/0032461 A1 * | 2/2006 | Sporn | 119/797 |
| 2012/0247398 A1 * | 10/2012 | Poch | 119/795 |
| 2013/0167782 A1 * | 7/2013 | Poch | 119/795 |

* cited by examiner

*Primary Examiner* — Trinh Nguyen
(74) *Attorney, Agent, or Firm* — Ascentage Law, PLLC

(57) ABSTRACT

A pet leash has a main connector and a secondary security connector. The main connector and leash can be similar to a conventional dog leash product, where the main connector can connect to, for example, a harness worn by the pet. The secondary security connector can connect to, for example, a collar worn by the pet. With this type of connection, should one connector fail for any reason, the other connector may prevent the loss of the animal.

15 Claims, 2 Drawing Sheets

PET LEASH WITH ADJUSTABLE SECURITY EXTENSION

BACKGROUND OF THE INVENTION

The present invention relates to pet leashes and, more particularly, to a pet leash having a main connector and a secondary, adjustable security extension connector.

Due to failure of connectors or snaps on pet leashes, the slipping of an ill-fitting collar, improperly adjusted harness or the ability of some dogs to contort out of a head halter or harness, a pet can become lost. Although obedience training is always the number one prevention, there are many situations that can result in the tragedy of a lost pet.

Leashes are often connected to a collar, halter or harness through a single connector. This connector can fail and the pet can get away from their caretaker. Protective pet parents need an improved way to ensure this cannot happen and this invention presents a solution.

One conventional head halter has a built-in supplemental, non-adjustable-length connector for a collar. All other known devices, however, depend upon only a single connection to secure the dog.

As can be seen, there is a need for an improved safer apparatus for securing a pet where, should the main connector fail, a secondary connector might prevent an accidental release and tragic loss of the pet.

SUMMARY OF THE INVENTION

In one aspect of the present invention, a pet leash comprises a main leash; a main connector attached at one end of the main leash; a security extension extending from the main leash adjacent to the main connector, the security extension being adjustable in length; and a secondary connector attached at one end of the security extension.

In another aspect of the present invention, a pet leash comprises a main leash; a main connector attached at one end of the main leash; a security extension connector attached to the main leash adjacent to the main connector; a security extension interconnected to the security extension connector; a secondary connector attached at one end of the security extension; and a slide buckle disposed along the security extension to provide a length adjustment of the security extension.

In a further aspect of the present invention, a method for securing an animal on a leash comprises securing a main connector to a main control mechanism attached to the animal, the main connector disposed at one end of a main leash; securing a secondary connector to a secondary control mechanism attached to the animal, the secondary connector attached to a security extension, the security extension extending from the main leash, adjacent to the main connector; and adjusting the length of the security extension so that there is no tension in the security extension when the main connector is attached to the main control mechanism.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a pet leash having a main connector and a secondary security connector. The main connector and leash can be similar to a conventional dog leash product, where the main connector can connect to, for example, a harness worn by the dog. The secondary security connector can connect to, for example, a collar worn by the dog. With this type of connection, should one connector fail for any reason, the other connector may prevent the loss of the animal.

Figure 1:
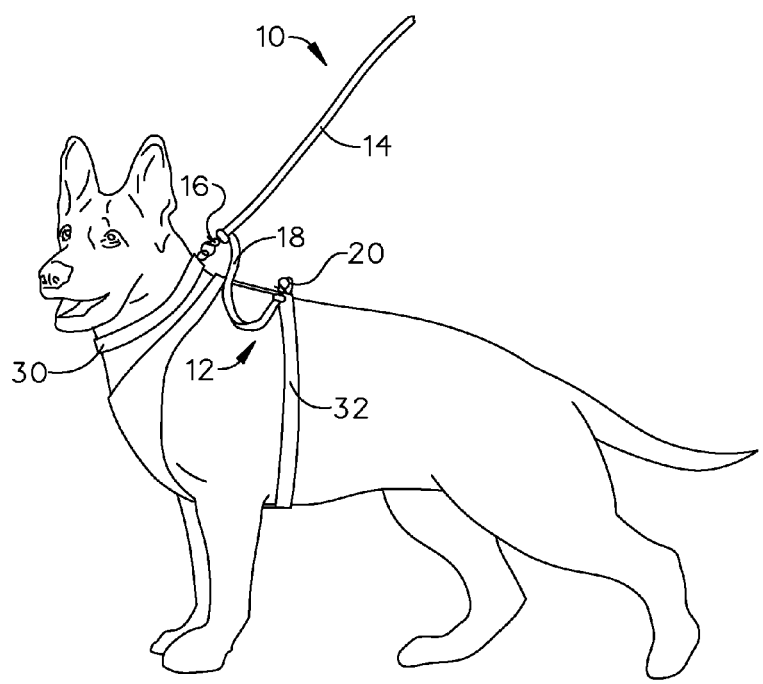
FIG. 1 is a perspective view of a pet leash, in use on a dog, according to an exemplary embodiment of the present invention.
Figure 2:
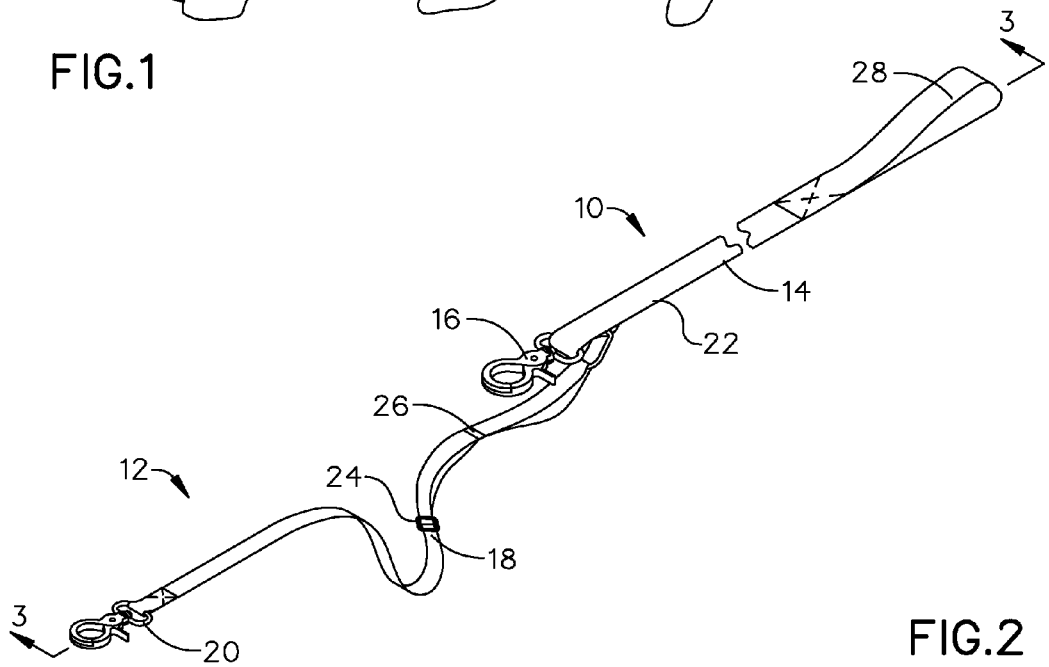
FIG. 2 is a perspective view of the pet leash of FIG. 1, with both the primary and secondary connectors disconnected.
Figure 3:
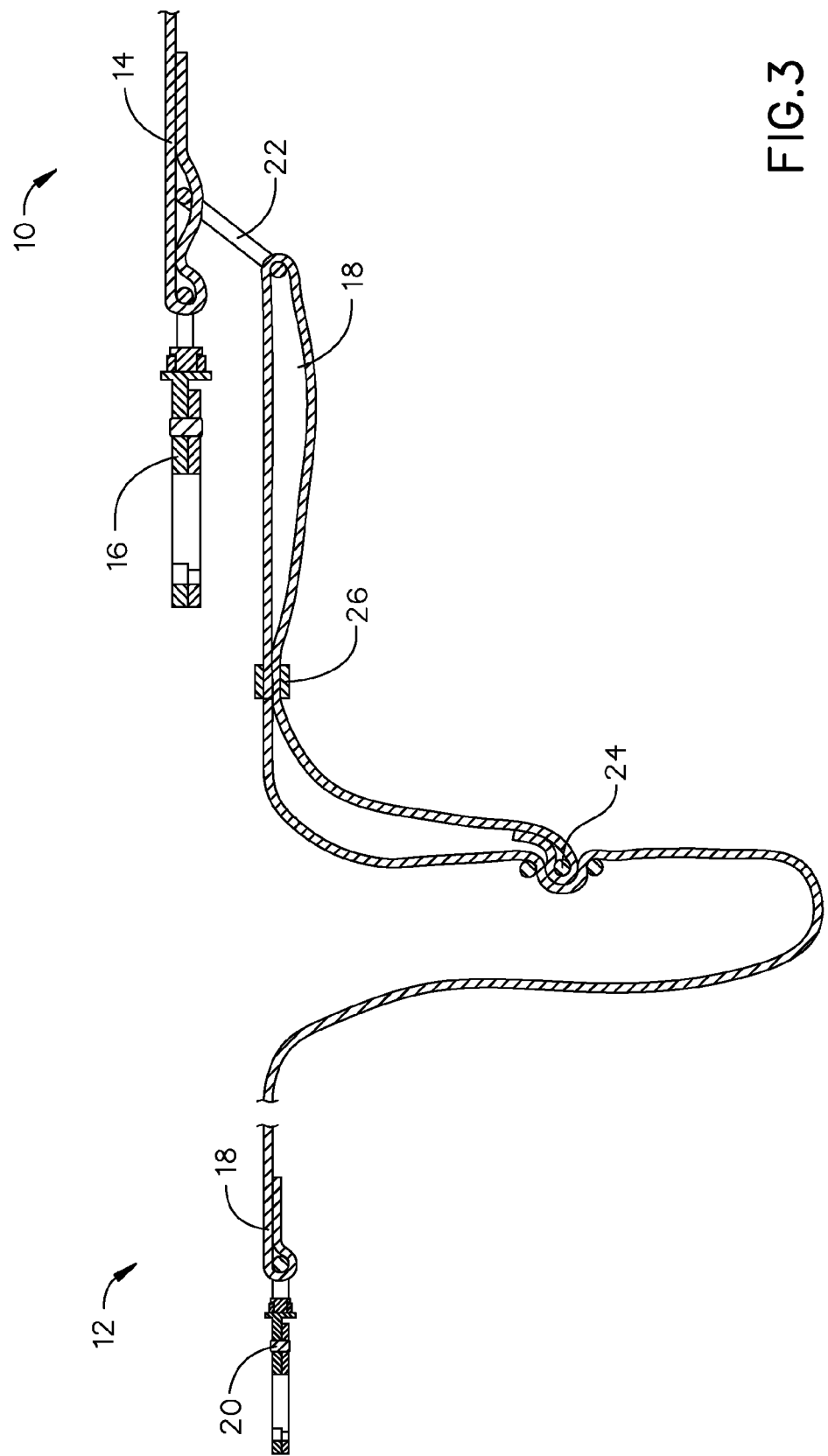
FIG. 3 is a partial cross-sectional view taken along line 3-3 of FIG. 2, illustrating the adjustability of the security extension.

Referring now to FIGS. 1 through 3, a main leash 10 can include a main leash strap 14 having a main connector 16 disposed on the end thereof. The main connector 16 can be of various designs, such as a swivel snap connector, for example.

A security extension connector 22 can be disposed along the main leash 10, typically adjacent to the main connector 16. The security extension connector 22 can effectively connect an adjustable security extension 12 to the main leash 10. The security extension connector 22 can be, for example, a D-ring. In some embodiments, the security extension connector 22 can include a spring snap, similar to a carabineer, for example, to allow removal of the security extension 12 therefrom.

The security extension 12 can be made from a security leash strap 18 that has a slide buckle 24 for adjusting the length thereof. Of course, other methods for making the security leash strap 18 adjustable in length are contemplated within the scope of the present invention. A retainer loop 26 can be disposed to form a loop at a proximate end thereof. The retainer loop 26 can be looped through the security extension connector 22 to attach the security extension 18 to the main leash 10.

A secondary connector 20 can be disposed at a distal end of the security leash strap 18. Like the main connector 16, the secondary connector can be of various designs, such as a swivel snap connector, for example.

The main leash 10 and the security leash strap 18 can be made of the same or different materials, typically of nylon webbing, for example. The length of the main leash 10 can be designed according to a user's application or need. In some embodiments, the main leash 10 can be made part of a retractable leash. The security leash strap 18 can be made in an appropriate length to allow the main connector 16 to secure the dog while the security leash strap 18 remains loose and secures the dog only should the main connector 16 fail for some reason.

To use the leash of the present invention, there is no learning curve needed. By way of example, the only difference between the leash of the present invention and a conventional leash is that if the dog normally wears only a harness, a collar would also be needed. In this case, the main leash connects to the harness and the security extension connects to the collar, where the length of the security extension can be adjusted so that there would be no tension pulling on the collar. If a collar is normally used, the main leash would be connected to the collar (as shown in FIG. 1) with the security extension connected to the harness. The length of the security extension can be adjusted so that there is no tension or pulling on the security extension. If a front-leading harness or head halter is the main control, a collar would be used and the extension should be adjusted to be as short as possible to avoid the dog from tripping on it. In each case, the main connector is connected to the main control mechanism (such as the collar 30 in FIG. 1) and the security extension is connected to the secondary control mechanism (such as the harness 32 in FIG. 1). In no case should the security extension be used as the main connector, bypassing the inherent security of a double connection, nor should the combination of the main and security extension be used to secure two animals. Using typical safety, if the handle of the main leash is webbing or leather, the handle of the main leash should be slipped over the wrist and then gripped by the hand. It should not simply be held by the fingers.

It should be understood, of course, that the foregoing relates to exemplary embodiments of the invention and that modifications may be made without departing from the spirit and scope of the invention as set forth in the following claims.

What is claimed is:

1. A pet leash system comprising:
   a main control system of a pet provided about a pet at a first location;
   a secondary control system of the pet provided about the pet at a second location;
   a main leash;
   a main connector provided at a first end of the main leash, the main connector being affixed to the main control system of a pet;
   a security extension extending from the main leash at a point adjacent to the main connector, the security extension extending from a point located proximal the first end, the security extension being adjustable in length; and
   a secondary connector provided at a distal end of the security extension, the secondary connector being affixed to the secondary control system of the pet.

2. The pet leash system of claim 1, further comprising a security extension connector attached to the main leash adjacent to the main connector, the security extension attached to the security extension connector.

3. The pet leash system of claim 2, wherein the security extension connector is a D-ring.

4. The pet leash system of claim 1, further comprising a slide buckle disposed along the security extension to provide adjustment of the length of the security extension.

5. The pet leash system of claim 1, further comprising a retainer to form a loop at an end of the security extension opposite the secondary connector.

6. A pet leash system comprising:
   a main control system of a pet provided about a pet at a first location;
   a secondary control system of the pet provided about the pet at a second location;
   a main leash;
   a main connector attached at a first end of the main leash, the main connector being affixed to the main control system of a pet;
   a security extension connector attached to the main leash adjacent to the main connector, the security extension connector being located adjacent the first end and abutting the main connector;
   a security extension interconnected to the security extension connector;
   a secondary connector attached at a distal end of the security extension, the secondary connector being affixed to the secondary control system of the pet; and
   a slide buckle disposed along the security extension to provide a length adjustment of the security extension.

7. The pet leash system of claim 6, wherein the security extension connector is a D-ring.

8. The pet leash system of claim 6, further comprising a retainer including a loop provided at an end of the security extension opposite the secondary connector.

9. A pet leash system comprising:
   a main control system of a pet;
   a secondary control system of the pet;
   a main leash;
   a main connector attached at a first end of the main leash, the main connector being affixed to the main control system of a pet using a swivel connection;
   a D-ring attached to the main leash adjacent to the main connector, the D-ring being located adjacent the first end and abutting the main connector;
   a security extension extending from the D-ring and terminating in a distal end;
   a secondary connector attached at the distal end of the security extension, the secondary connector being affixed to the secondary control system of the pet using a swivel connection; and
   a slide buckle disposed along the security extension to provide a length adjustment of the security extension configured to allow for varying a distance between the main control system and secondary control system based on a size of a particular pet.

10. The pet leash system of claim 1, wherein the secondary connector is a swivel connector.

11. The pet leash system of claim 1, wherein the main connector is a swivel connector.

12. The pet leash system of claim 1, wherein both the main connector and the secondary connector are swivel connectors.

13. The pet leash system of claim 6, wherein the secondary connector is a swivel connector.

14. The pet leash system of claim 6, wherein the main connector is a swivel connector.

15. The pet leash system of claim 6, wherein both the main connector and the secondary connector are swivel connectors.

\* \* \* \* \*